United States Patent [19]

Miller

[11] 4,094,527
[45] June 13, 1978

[54] BOAT TRAILER

[76] Inventor: Richard L. Miller, 3612 Woolworth Bldg., 233 Broadway, New York, N.Y. 10007

[21] Appl. No.: 752,675

[22] Filed: Dec. 20, 1976

[51] Int. Cl.² .............................................. B60P 3/10
[52] U.S. Cl. ............................... 280/414 R; 214/85.1
[58] Field of Search ...................... 280/414 R, 414 A; 9/1.2; 214/85.1, 85.5

[56] References Cited

U.S. PATENT DOCUMENTS

| 2,708,045 | 5/1955 | Shantz | 280/414 R |
| 3,066,810 | 12/1962 | Sartin | 214/85.1 X |
| 3,155,249 | 11/1964 | Johnson | 280/414 R |
| 3,348,861 | 10/1967 | Curtis et al. | 280/414 R |
| 3,554,394 | 1/1971 | Hedman | 280/414 R |
| 3,572,743 | 3/1971 | Parr | 280/414 R |

*Primary Examiner*—John A. Pekar

[57] ABSTRACT

A flatbed trailer for retaining thereon a boat having a hull and keel, and facilitating launching and landing of the boat. Supports, in the form of four stanchions, are diagonally positioned on the flatbed and are inwardly directed toward the center part of the flatbed. Adjustable telescopic posts on the stanchions with pads at the end thereof, permit proper adjustment of the supports to the size of the hull of the boat. Pivoted rollers are placed intermediate of the stanchions to rotatably engage the hull portion to accommodate entry and exit of the boat from the trailer, and for supporting the keel portion during retention of the boat on the trailer. The rollers form a surface angularly positioned with respect to the flatbed, and directed rearwardly thereof, to pivot forward to receive the hull portion during entry of the boat. The rollers subsequently pivot backward to accommodate the keel portion. A retractable wheel can be selectively utilized in place of a leveling jack. The retractable wheel restricts movement of the flatbed to a direction colinear with the longitudinal axis of the flatbed. A winch to hoist the boat is placed on a tower positioned on the flatbed, and a triangular ladder is formed in conjunction with the tower to permit access to the winch.

23 Claims, 11 Drawing Figures

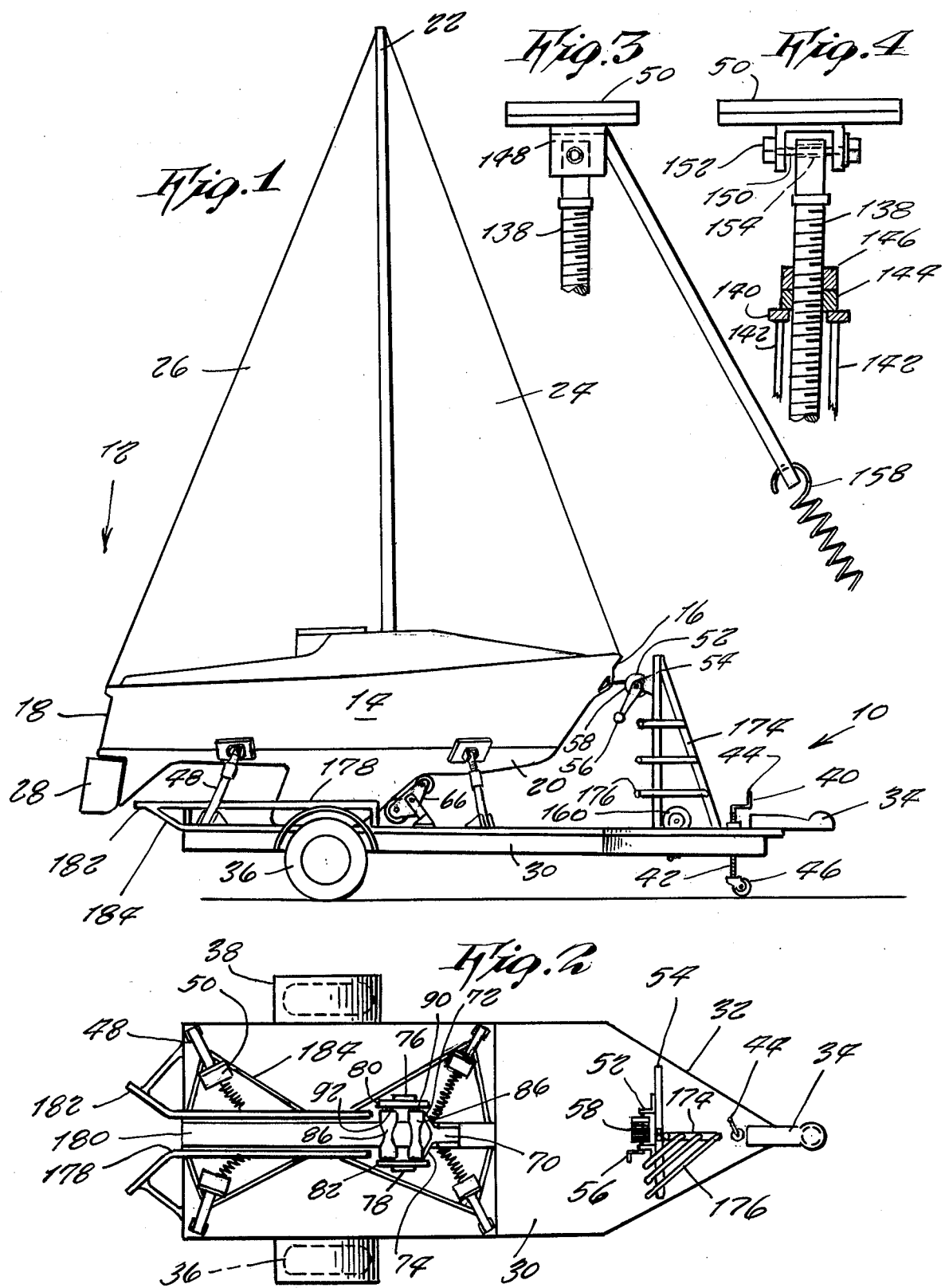

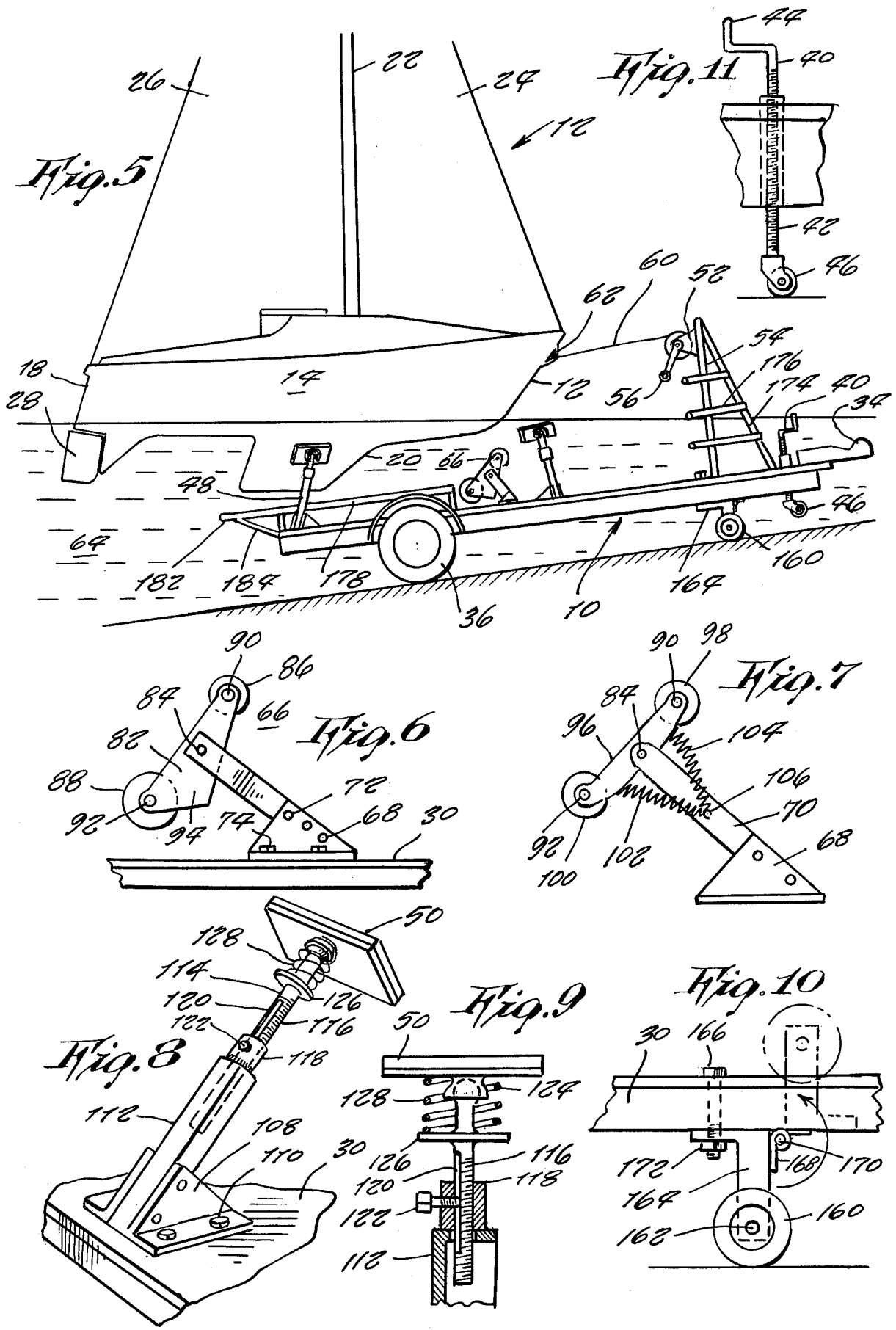

BOAT TRAILER

BACKGROUND OF THE INVENTION

One of the most important problems in utilizing water borne vehicles, typically boats, is in launching and landing of the boats as well as storing them. Boats which contain flat bottom hulls are easier to remove from the water since they can be properly dragged onto the shore. Similarly, they can be launched with relative ease, and can be stored on a flat storage surface. However, boats which contain angled bottoms, typically sailboats, are more difficult to manipulate during launching and landing, and most difficult to store.

Generally, sailboats include a hull which is of triangular shape converging towards the bottom from which a keel downwardly extends. The keel is generally of a thin vertical section. As a result, it is exceedingly difficult to store the sailboat since accommodation must be made for the vertical keel portion and the converging hull portion. At the same time, it is also difficult to properly launch or retreive the sailboat because of the shape of the hull and the keel.

To accommodate storage, as well as launching and retreiving of such sailboats, there is generally utilized a trailer which contains supports on the side of the trailer which abut and hold the hull portion and permit the boat to be stored in an upright position, while accommodating the vertical keel portion on the trailer. To retreive the boat, the trailer is typically rolled directly into the water, and a rope from a winch is let out and hooked onto the boat. The boat is then reeled onto the trailer at which time the supports abut the hull and hold the sides of the boat while the rope from the winch keeps the boat from sliding off the trailer. The trailer is then pulled out of the water with the boat thereon, and the boat is retained on the trailer for retention and storage. Similarly, when launching the boat, the trailer supporting the boat is moved directly into the water and the boat is pushed off the trailer while removing the winch from holding the boat.

Various problems have been presented in connection with the state of the art trailers used for the above mentioned purposes. One of the problems deals with entry and exit of the boat, and proper retention of the boat on the trailer. While the supports, typically a number of stanchions placed around the flatbed are available for holding the hull, they are frequently of improper size to accommodate many sailboats. Since sailboats and their hulls come in various sizes, a standard support will be improperly sized for many varieties of boats. While a support of a given height and angular position may be appropriate for one shape of a hull, a different boat with a modified hull shape would be improperly held by the same support means.

An additional problem with present trailers is in connection with the launching and landing of the boat. As the boat is hoisted by means of the winch, the boat moves onto the trailer and as the keel gets into position on the trailer, there is a tendency for the boat to pitch forward. The boat will continue the forward pitch until the supports abut the hull at which time the boat will straighten out. However, the temporary forward pitching of the boat may damage parts of the trailer and even the trailer itself. It may further damage goods and contents contained on the sailboat because of this sudden forward pitching. Similarly, during launching, as the boat moves rearwardly of the trailer, once the front supports no longer engage the keel or the hull, the boat with the keel still on the trailer and with the bow of the hull no longer supported, may pitch rearwardly, with the stern being suddenly lowered. This tip may cause damage to the trailer as well as to contents in the boat.

Furthermore, while the support means on the trailer are available to properly support the hull, there is provided little if any support directly to the keel. Since the keel is usually weighted, the weight of the keel is directly forced against the bottom of the flatbed and may scrape or mar the flatbed as well as providing cuts and gashes therein.

Still another problem with prior art trailers is in connection with the maneuvering of the trailer itself. The trailer typically includes a set of rear wheels and a universally rotating wheel in the front of the trailer. This permits the trailer to be properly steered by means of a crank to move the trailer in a desired direction. Usually, the universal wheel is also connected to a leveling jack whereby the wheel itself can be adjusted to a proper height or entirely raised during connection to a car or other pulling vehicle, to which the trailer is hitched. However, because of the universal wheel, as the trailer is being pushed into or pulled out of the water, there is a tendency for the universal wheel to rotate thereby altering the direction of movement of the trailer. When a boat is to be launched at a particular position, it becomes difficult to manipulate the trailer into the water and have it move along a single line without veering to either side.

A further problem with existing trailers is in connection with appropriate manipulation of the winch. Because the winch is utilized to hoist and hold the boat, the winch is generally placed on a tower extending above the surface of the flatbed so that the rope, which is connected to an eye in the bow, can be at approximately horizontal level with the bow. As a result of its being positioned on a tower, it becomes difficult to manipulate a crank to operate the winch.

SUMMARY OF THE INVENTION

Accordingly, it is an object of the present invention to provide a trailer for retaining a boat having a hull and keel and which avoids the aforementioned problems of prior art devices.

Another object of the present invention is to provide a trailer which can facilitate launching and landing of a boat having a hull and keel, and which avoids the aforementioned problems of prior art devices.

Yet another object of the present invention is to provide a trailer for use in conjunction with a boat and which includes adjustable support means positioned to engage the hull of the boat, the supports being telescopically adjustable to accommodate various hull sizes.

A further object of the present invention is to provide a trailer for use in conjunction with a boat, and including pivoted rolling means which can accommodate entry and exit of the boat from the trailer by engaging the hull portion, and for supporting the keel portion during retention of the boat on the trailer.

Yet a further object of the present invention is to provide a trailer for use in conjunction with a boat and including a retractable hinged wheel which can restrict movement of the trailer to a direction colinear with the longitudinal axis of the flatbed.

Yet a further object of the present invention is to provide a trailer for use with a boat and including a winch for hoisting and holding the boat, and having a ladder constructed in conjunction with a tower wall holding the winch.

Still another object of the present invention is to provide a trailer for use in conjunction with boats, and which includes rolling means providing a rolling surface which is angularly positioned with respect to the trailer and facing rearwardly thereof, and which can be pivoted around an axis transverse to the trailer.

Yet a further object of the present invention is to provide a trailer for use with a boat, and containing spring biased adjustable supports positioned to engage the hull of the boat to thereby retain the boat in position on the trailer, wherein the spring can restrain initial impact of the boat on the support means.

Another object of the present invention is to provide a trailer for use with boats, and which includes a universal wheel at the end of a leveling jack and a hinged retractable wheel, wherein the two wheels can be selectively utilized.

These and other objects, features and advantages of the invention will, in part, be pointed out with particularity and will, in part, become obvious from the following more detailed description of the invention, taken in conjunction with the accompanying drawings which form an integral part thereof.

Briefly, there is provided a trailer for retaining thereon a boat having a hull and a keel, and which facilitates launching and landing of the boat. The trailer includes a flatbed with wheels connected to the flatbed for moving the trailer into and out of cooperative relationship with the boats. Connected to the flatbed are support means which are positioned to engage the hull of the boat on opposite sides thereof, to thereby retain the boat in position on the trailer. Also positioned on the flatbed, intermediate of the support means, are pivoted rolling means for rotatingly engaging the hull portion to thereby accommodate entry and exit of the boat from the trailer, and also for supporting the keel portion during retention of the boat on the trailer.

In an embodiment of the invention, the pivoted rolling means are positioned whereby a plane tangential to the rolling means would be angled with respect to the flatbed and facing rearwardly of the trailer. Two rollers are utilized and position means are included for placing one of the rollers in a lower spaced relationship with the other. In this manner, as the hull initially engages the rolling means, the rollers can pivot forward of the boat permitting the hull to roll on the rollers until the keel portion is reached, at which time the rollers will pivot rearwardly to thereby engage the keel portion and retain it while the boat is stored on the trailer.

In an embodiment of the invention the support means comprises four diagonally opposed adjustable stanchions. Each stanchion includes an angularly positioned post facing toward the longitudinal center of the flatbed. A shaft means is adjustably extended from the post means. A pad means is positioned at the end of the post means and is pivotal about an axis perpendicular to the longitudinal axis of the shaft means. A spring means is coupled to each stanchion to restrain the impact of the boat upon engagement with the pad means.

In an embodiment of the invention, the wheels are located adjacent one end of the flatbed. A leveling jack is positioned adjacent the other end with a universal wheel at the end of the leveling jack. A retractable hinged wheel is coupled to the flatbed adjacent the other end. The hinged wheel restricts movement of the flatbed to a direction colinear with the longitudinal axis of the flatbed.

In an embodiment of the invention there is provided a tower on the flatbed with a winch connected onto the tower. The tower is formed of an upright triangular wall, and a ladder is formed in conjunction with the wall. The ladder includes a pole angularly connected from the flatbed to the top of the triangular wall and positioned in a plane perpendicular to the wall. Rungs are spacedly interconnected between the pole and the wall to provide the ladder arrangement.

BRIEF DESCRIPTION OF THE DRAWINGS

In the drawings

FIG. 1 is a side elevational view showing a boat retained on the trailer.

FIG. 2 is a plan view of the trailer.

FIG. 3 is a partial side view of one of the support means.

FIG. 4 is a partial top view of the support means shown in FIG. 3.

FIG. 5 is a side view showing a landing or launching of the boat onto the trailer.

FIG. 6 is a side view of the pivoted rolling means.

FIG. 7 is a side view of an alternate embodiment of the pivoted rolling means.

FIG. 8 is a perspective view of an embodiment of the support means.

FIG. 9 is a partially sectioned top view of the support means shown in FIG. 8.

FIG. 10 is a fragmentary side view showing the retractable wheel.

FIG. 11 is a fragmentary side view showing the leveling jack and universal wheel.

In the various figures of the drawing, like reference characters designate like parts.

DESCRIPTION OF THE PREFERRED EMBODIMENTS

In the present invention there is provided a trailer, shown generally at 10, which can be utilized to retain as well as launch and land a boat shown generally at 12. The type of boat for which the trailer is used includes a hull 14 having a bow 16 and stern 18 and a keel 20 which is generally of weighted material. The hull is of a triangular shape and converges towards the bottom of the boat. The keel is generally of a thin vertical section which extends downwardly from the bottom of the hull.

Typical of such boats is a sailboat which further includes a mast 22, upwardly extending from the boat, and including sails 24, 26.

Also included would be a rudder 28 and other portions, as is well known in the art.

The trailer generally includes a flatbed 30 of substantially rectangular shape and including a front triangular portion 32 which converges towards a trailer hitch 34 utilized to pull the trailer by connection to a car, cab section, or other vehicle. Wheels 36, 38 are provided on either side of the rear portion of the trailer to support the trailer and permit its movement. A further wheel 40 is included at the front of the trailer. Typically, this wheel arrangement includes a leveling jack 42 which can be manipulated by the lever 44. A universally rotatable wheel 46 is placed at the bottom of the leveling jack permitting the trailer to move in any desired direction. At the same time, the entire wheel 46 can be raised above the ground surface when the trailer is hitched up to the cab, so the trailer will follow the direction of movement of the cab and merely utilize its rear wheels 36, 38.

In order to retain a boat on the trailer, supports 48 are provided. Four such supports are shown diagonally positioned on the flatbed. The supports typically include a pad 50 which is faced towards the inner center longitudinal line of the flatbed and is positioned to engage the hull of the boat on opposite sides thereof to thereby retain the boat in position on the trailer. A winch 52 is placed on top of a tower 54 positioned on the flatbed and including a crank 56 controlling the movement of a coil 58 having a rope 60 extending therefrom and adapted to connect to an eye 62 on the bow of the boat.

When it is desired to retrieve the boat, the trailer is moved directly into the water 64, as shown in FIG. 5, and the rope 62 from the winch 54 is unreeled by means of the crank 56. It is then hooked onto the eye 62 of the bow of the hull and the sailboat is reeled onto the trailer. As the boat reaches the trailer, the supports 48 engage portions of the boat, typically the hull. However, as the boat enters onto the trailer, when the keel arrives onto the trailer, there will be a tendency for the bow to pitch downwardly onto the trailer. This may cause damage to the trailer and/or to the boat. The rope is continuously reeled in until the supports 48 engage opposite sides of the hull and retain the hull of the boat, with the keel extending onto the trailer, as shown in FIG. 1. The trailer, with the boat retained thereon can now be removed from the water and the trailer can be stored with the boat maintained thereon.

To launch the boat, the trailer is again brought into the water and the rope removed from the eye of the boat. It is then necessary to push the boat off the trailer releasing engagement from the supports 48, and the trailer and boat can then be separated permitting the boat to freely move into the water. However, as the boat is leaving the trailer, with the keel still in contact with the trailer, there is a tendency for the stern 18 to pitch rearwardly, thereby again possibly damaging the boat and/or the trailer.

One of the biggest problems with the launching and landing procedure is in tendency of the forward or rearward pitching of the boat. During its storage one of the main problems is that there is little direct support for the keel portion and frequently the weight of the keel on the trailer may either break the keel or damage the trailer.

In order to alleviate these problems, there is provided a pivoted rolling means, shown generally at 66 and most clearly in FIG. 6. The rolling means includes a base 68 which is coupled directly onto the flatbed 30 or onto a platform placed on the flatbed. A bracket 70 is supported from the base by means of the bolts 72. The bolts 74 couple the base to the flatbed. The bracket 70 is in the shape of a yoke, as is best seen in FIG. 2 and includes the arms 72, 74 which terminate in end sections 76, 78. Pivot plates 80, 82 are journaled on pivots 84 which are mounted onto the end plates 76, 78 of the bracket 70. Connected between the pivot plates are rollers 86, 88. The rollers are coupled to the plates by means of the shafts 90, 92 which pass through the two pivot plates 80, 82.

The bracket 70, in the form of a yoke, is directed upwardly and rearwardly of the flatbed 30. The pivot plates are permitted to pivot about an axis perpendicular to the longitudinal axis of the yokes. In this manner, the rollers present an angled receiving surface to the oncoming boat. That is to say, a plane tangential to both rollers 86, 88, would be facing upwardly and rearwardly. Furthermore, the tangential plane could pivot about an axis parallel to the axis 84. Furthermore, each of the rollers 86, 88 can roll about its own axes 90, 92 respectively.

The rollers 86, 88 are arranged to have one roller in a lower spaced relationship with respect to the other. As shown in FIG. 6, the roller 88 is lower than the roller 86. This is accomplished by making the pivot plate of a triangular shape with most of the mass and weight of the pivot plate included on the lower portion beneath the bracket 70. Thus, the bottom portion 94 would have more mass and weight and would therefore be pulled downardly to maintain the roller 88 in a lower position. Also, the roller 88 is formed larger than the roller 86 to thereby ensure that it will be lower.

An alternate arrangement is shown in FIG. 7 which wherein a uniformly shaped pivot plate 96 is pivoted about the pivot 84 journaled onto the bracket 70 with substantially identical rollers 98, 100 rotating about their respective shafts 90, 92. In this embodiment, the positioning of one roller beneath the other is provided by the biasing springs 102, 104 which respectively interconnect between a point 106 on the bracket arm and each of the respective ends of the pivot plate 96.

With the inclusion of the pivoted rolling means, as the boat arrives onto the trailer, the hull portion will initially engage the pivoted rolling means and cause the pivot plate to pivot in a clockwise direction thereby supporting the hull as the hull rolls along the two rollers. This step will prevent the bow of the boat from pitching forward. As the boat continues being hoisted onto the trailer, when the groove between the hull and the keel engages the pivoted rolling means, it will force the pivot plate to rotate in a counter clockwise direction thereby engaging the keel portion and supporting the keel during the storage of the boat on the trailer.

Similarly, during launching of the boat, the removal of the keel from direct engagement with the pivoted rolling means, and the movement of the boat off of the trailer will cause the hull to move the pivot plate in a clockwise direction to thereby support the hull as it rolls along the pivoted rolling means during its exit from the trailer. This will maintain the boat in a proper level avoiding its pitching rearwardly during its exit.

An additional problem in connection with properly retaining the trailer on the boat is in connection with the support means. Typically such support means include the stanchions with their pads, which pads engage the hull on opposite sides thereof. However, generally such stanchions are of predetermined fixed height and angle, and are therefore not appropriate for accommodating various sized boats and their respective hull shape. Accordingly, as shown in FIGS. 8 and 9, a base 108 is coupled by means of the bolts 110 directly to the flatbed 30 or to an appropriate surface thereon. A post 112 is supported by the base and positioned to face upwardly and slightly inwardly toward the center of the flatbed. A shaft 114 includes a threaded portion 116. The shaft can freely pass into the post 112. An adjusting nut 118 is formed on the post 112 to adjustably extend the height of the shaft 116 from the post 112. A longitudinal groove 120 is formed into the shaft and a set screw 122 passes through the adjusting nut and can set into the longitudinal groove 120 to lock the shaft in place once its position has been properly adjusted. The pad 50 is placed at the end of the shaft 116 and is permitted to pivot with respect to the shaft by means of the ball and socket joint 124. A plate 126 is fixedly connected adjacent the end of the shaft in spaced relationship with the pad 50, and a biasing spring 128 is positioned coaxially around the shaft in the space between the plate 126 and the pad 50.

In utilizing the supports shown in FIGS. 8 and 9, the amount of the shaft extending from the post is adjusted to accommodate the proper size and shape of the hull. Once adjusted, it is locked into place. When the hull arrives onto the trailer, as it engages the pads, the springs restrain the impact of the boat against the pads and thereby provide some resiliency to the thrust of the boat.

Referring to FIGS. 3 and 4, there is shown an alternate embodiment of the support means. The threaded shaft 130 fits into a post formed by a plate 140 and rods 142. The adjusting nut 144 is formed at the end of the plate 140 and a second adjacent locking nut 146 is utilized to lock the height of the adjusted shaft extending from the post. The pad 50 is coupled to the end of the shaft 138 by means of the yoke 148 through which is passed the pivot pin 150 bolted at either end by means of the bolts 152. The aperture 154 through the shaft 138 is formed with sufficient clearance to provide a slack in the movement of the pad and permitting slight freedom of movement of the pads 50 upon initial contact of the boat hull with the pad 50. The spring includes a rod 156 with a biasing spring 158 which connects to the flatbed itself.

With the embodiments of FIGS. 3 and 4, the extension of the shaft from the post is initially adjusted and such height is locked in place. As the hull of the boat engages pad 50, the spring absorbs some of the thrust. Also, the slack in the pivot arrangement permits some final adjustment of the pad to the configuration and shape of the hull.

One of the additional problems with prior art trailers is in connection with proper manipulation of the trailer itself, especially into and out of the water. With the use of the universally rotating wheel 46, the trailer has a tendency to swerve, especially when passing into the water as well as on sand, and when hitting rocks and shells. When trying to retrive the boat, it is necessary to properly position the trailer directly in the path of the boat. This requires precise movement of the trailer into the water. The easily manipulable and movable wheel 46 often prevents such exact engagement.

To solve this problem, there is provided an additional hinged wheel, shown in FIG. 10, which is retractable. The wheel 160 is rotatable about a shaft 162 formed at the end of a leg 164 which can be locked in place onto the flatbed 30 by means of the nut and bolt arrangement 166, 172. The leg has coupled thereto a hinge plate 168 which rotates about a hinge pin 170. By removing the bolt 166 or the nut 172 the wheel can be pivoted about the axis of the hinge pin into its upper position, shown in dotted line in FIG. 10.

In use, the hinged wheel is generally utilized selectively with the universal wheel 46. When storing or moving the trailer itself with the boat thereon, the retractable wheel 160 is moved to its upward position, as shown in FIG. 1, and the universal wheel 46 is utilized to direct the movement of the trailer. However, when launching or landing the boat, and during the time it is necessary to move the boat in a single direction placing it into proper relationship with the boat, the wheel 160 is lowered and the leveling jack 40 is adjusted to raise the wheel 46 out of engagement with the floor surface. In this way, the flat bed will only be able to move colinear with the longitudinal axis of the flatbed.

A further problem in conjunction with utilization of the prior art trailers of the type described, is in conjunction with manipulating the winch. As shown, the winch is placed adjacent the top of a tower, so that the rope 60 can be level with the eye 62 in the bow. Therefore, the tower is fairly high above the flatbed. It is therefore difficult to properly reach the crank 56 to manipulate the winch.

In order to alleviate the problem, there is presently provided a pole or rod 174 connected from the flatbed to the top of the wall 54 forming the tower supporting the winch. Rungs 176 are then placed in spaced relationship with each other and interconnecting the pole 174 with the walls 54. The pole 174 is placed in a plane perpendicular to the plane of the wall 54. In this manner, a triangular ladder is formed, having converging sides towards the top. This type of ladder occupies little room and at the same time provides the necessary ease to manipulate the winch.

To facilitate entry and exit of the boat, guide rails 178 are provided on either side of a keel support 180 forming a passageway through which the hull and keel can pass. The pivoted rolling means 66 is formed transverse to this passageway and along the length of the passageway. The guiderails extend outwardly past the rear of the flatbed to form a mouth 182 thereby guiding entry of the keel along its proper position. Struts 184 support rail 178.

Accordingly, there has been provided an improved trailer for accommodating storage of a boat thereon as well as facilitating landing and launching of the boat. A pivoted rolling means is included to engage the hull portion during entry and exit of the boat, and also for supporting the keel portion during storage of the boat on the trailer. Adjustable support means are also included for engaging the hull of the boat on opposite sides thereof to thereby retain the boat in position on the trailer. Springs are utilized to properly absorb and restrain some of the force of the hull against the support means. A retractable wheel is available to be selectively utilized with a universal wheel, to thereby restrict movement of the flatbed during its entry and exit of water. A ladder is also formed in conjunction with the tower supporting the winch, to facilitate manipulation of the winch.

There has been disclosed heretofore the best embodiments of the invention presently contemplated. However, it is to be understood that various changes and modifications may be made thereto without departing from the spirit of the invention.

What is claimed is:

1. A trailer for storing thereon a boat having a hull and keel, and facilitating launching and landing of the boat, and comprising:
    a flatbed having a longitudinal center axis;
    wheels connected to the flatbed for moving the trailer into and out of cooperative relationship with the boat;
    support means connected to the flatbed and positioned to engage the hull of the boat on opposite sides thereof, to thereby retain the boat in position on the trailer, and
    pivoted rolling means positioned on the flatbed intermediate said support means for rotatingly engaging the hull to accommodate entry and exit of the boat from the trailer, and for supporting the keel during retention of the boat on the trailer, and positioning means for angularly positioning said pivoted rolling means with respect to said flatbed and facing rearward of said flatbed.

2. A trailer as in claim 1 and wherein said rolling means further comprises base means connected onto the flatbed, bracket means connected to said base means, pivot plate means pivotally supported by said bracket means, and first and second rollers rotatably connected to said pivot plate means.

3. A trailer as in claim 2 and wherein said bracket means are supported by said base means and are facing rearward of said flatbed, and wherein said positioning means comprises means for positioning one of said rollers in lower spaced relationship to each other.

4. A trailer as in claim 3 and wherein said bracket means comprises a yoke having two extended arms, and said pivot plate means comprises two plates respectively journaled on pivots located on said yoke arms, and pivotable about an axis perpendicular to said arms.

5. A trailer as in claim 4 and wherein the lower one of said rollers is larger than the upper one.

6. A trailer as in claim 4 and wherein said positioning means comprises biasing springs positioned between said yoke and between opposite ends of at least one of said plates.

7. A trailer as in claim 1 and wherein said support means comprises four diagonally opposed adjustable stanchions, each stanchion comprising post means angularly positioned toward the longitudinal center axis of the flatbed, shaft means adjustable extending from said post means, pad means positioned at the end of said post means and pivoted to rotate about an axis perpendicular to the longitudinal axis of said shaft means, and spring means coupled to each pad means to restrain the impact of the boat upon engagement with the pad means.

8. A trailer as in claim 1 and further comprising guide means positioned longitudinally of said flatbed for providing an accommodating passageway for entry and exit of the keel of the boat, said rolling means positioned transverse to said guide means.

9. A trailer as in claim 8 and wherein said guide means includes an entry mouth at the rear of the flatbed to receive the boat, and a keel support positioned longitudinally of said flatbed along said passageway.

10. A trailer as in claim 1 and further comprising a tower connected onto said flatbed, a winch on said tower, said winch including rope means connectable to the boat for pulling and retaining the boat, and a ladder connected to said tower.

11. A trailer as in claim 10 and wherein said tower is formed of an upright triangular wall section, and said ladder includes a pole angularly connected from the flatbed to the top of the triangular wall section and lying in a plane perpendicular to said wall section, and spaced rungs inter-connecting said pole with said wall section.

12. A trailer as in claim 1 and wherein said wheels are located adjacent one end of the flatbed, and further comprising a leveling jack positioned adjacent the other end of said flatbed, a universal rotatable wheel at the end of said leveling jack, and a retractable hinged wheel coupled to the flatbed adjacent said other end, said hinged wheel restricting movement of the flatbed to a direction colinear with the lontigudinal center axis of the flatbed and wherein said universal rotatable wheel and said hinged wheel can be selectively utilized.

13. A trailer for retaining thereon a boat having a hull and keel, and comprising:
a flatbed having a longitudinal center axis;
wheels connected to the flatbed for moving the trailer into and out of cooperative relationship with the boat, and
adjustable support means connected to the flatbed and positioned to engage the hull of the boat on opposite sides thereof to thereby retain the boat in position on the trailer and wherein said support means comprises four diagonally opposed adjustable stanchions, each stanchion comprising, post means angularly positioned toward the longitudinal center axis of the flatbed, shaft means adjustable extending from said post means, pad means loosely positioned at the end of said post means and pivoted to rotate about an axis perpendicular to the longitudinal axis of said shaft means, and spring means coupled to each pad means to restrain the impact of the boat upon engagement with the pad means.

14. A trailer as in claim 13 and wherein said shaft means is threaded, and further comprising adjustable nut means on said post means for telescopically adjusting said shaft means with respect to said post means, and locking means for securely coupling said shaft means to said post means at the selected position.

15. A trailer as in claim 14 and wherein said locking means comprises a locking nut means adjacent said adjusting nut means.

16. A trailer as in claim 15 and wherein said shaft means includes a longitudinal slot therein, and wherein said locking means includes a set screw extendable into said slot.

17. A trailer as in claim 14 and wherein said spring means includes a spring, and a rod coupled to said spring, said spring and rod extending between and interconnecting the flatbed and said pad means.

18. A trailer as in claim 13 and wherein said spring means comprises a plate connected transversely to said shaft means and a spring located around said shaft means extending between said plate and said pad.

19. A trailer as in claim 13 and further comprising pivoted rolling means positioned on the flatbed intermediate said support means for rotatingly engaging the hull portion to accommodate entry and exit of the boat from the trailer, and for supporting the keel portion during retention of the boat on the trailer, and rolling means comprising first and second rollers coupled to a pivot plate with one of said rollers in lower spaced relationship to the other, said rollers being angularly positioned with respect to the flatbed and face rearwardly of the trailer.

20. A trailer as in claim 19 and wherein said wheels are located adjacent one end of the flatbed and further comprising a leveling jack positioned adjacent the other end, a universal wheel at the end of the leveling jack, and a retractable hinged wheel coupled to the flatbed adjacent said other end, said hinged wheel restricting movement of the flatbed to a direction colinear with the longitudinal center axis of the flatbed.

21. A trailer for launching and landing of a boat having a hull and keel thereon, and comprising a flatbed having a longitudinal center axis, wheels connected to the flatbed for moving the trailer into and out of cooperative relationship with the boat, said wheels being positioned adjacent one end of the flatbed, and further comprising a leveling jack positioned adjacent the other end of the flatbed, a universal wheel located at the end of the leveling jack, and a retractable, nonsteerable, hinged wheel coupled to the flatbed adjacent said other end for rotation parallel to the longitudinal center axis of the flatbed, said hinged wheel restricting movement of the flatbed to a direction colinear with the longitudinal center axis of the flatbed, and wherein said universal wheel and said hinged wheel can be selectively utilized.

22. A trailer as in claim 21 and further comprising, support means connected to the flatbed and positioned to engage the hull of the boat on opposite sides thereof to thereby retain the boat in position on the trailer, wherein said support means comprises four diagonally opposed adjustable stanchions, each stanchion comprising post means angularly positioned towards the longitudinal center axis of the flatbed, shaft means adjustably extending from said post means, pad means positioned at the end of said post means and pivoted to rotate about an axis perpendicular to the longitudinal axis of the said shaft means, and spring means coupled to each pad means to restrain the impact of the boat upon engagement with the pad means.

23. A trailer as in claim 21 and further comprising pivoted rolling means positioned on the flatbed intermediate said support means for rotatingly engaging the hull portion to accommodate entry and exit of the boat from the trailer, and for supporting the keel portion during retention of the boat on the trailer, said rolling means comprising at least first and second rollers rotatably connected to a pivot plate with one roller in lower spaced relationship to the other whereby a plane tangential to both said rollers would be angled with respect to the flat bed and facing rearwardly of the flatbed.

* * * * *